United States Patent Office 3,267,084
Patented August 16, 1966

3,267,084
POLYMERIZABLE 5-ALKYLENE-m-DIOXANYL ACRYLIC ESTERS
David Rankin, Kansas City, Kans., and Gerald J. Mantell and Francis R. Galiano, Kansas City, Mo., assignors, by mesne assignments, to Gulf Oil Corporation, Pittsburgh, Pa., a corporation of Pennsylvania
No Drawing. Filed May 23, 1962, Ser. No. 196,916
38 Claims. (Cl. 260—86.1)

This invention relates to novel acrylic organic compounds. More particularly, it relates to novel acrylate esters having a 5-alkylene-m-dioxanyl acrylic ester structure represented by the following formula:

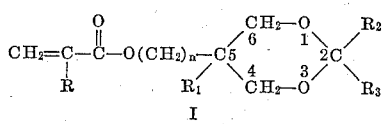

wherein R is hydrogen or a lower alkyl radical (preferably hydrogen or methyl), $R_1$ is a lower alkyl radical having one to four carbon atoms or a hydrogen atom, and $R_2$ and $R_3$ are selected from the group consisting of hydrogen, alkyl, and phenyl groups. Also, in the formula "$n$" represents an integer from one to four, inclusive.

When one or both of $R_2$ and $R_3$ is an alkyl or phenyl radical, the alkyl or phenyl radical is free of substituents which substantially interfere with the ester exchange reaction by which the 5-alkylene-m-dioxanyl acrylic esters of this invention are prepared. Permissible $R_2$ and $R_3$ radical substituents can be lower alkoxy such as methoxy, ethoxy, and like, lower alkyl such as methyl, ethyl, or cycloalkyl, nitro, halo such as chloro or bromo, dialkylamino such as dimethylamino and the like substituents, without departing from the spirit of the hereby provided invention.

When one or both of $R_2$ and $R_3$ is alkyl, alkyl has desirably one to eight carbon atoms, preferably one to four carbon atoms. The alkyl radical can be unbranched such as methyl, ethyl, n-octyl, and the like; it can be branched such as isopropyl, t-butyl, isoamyl, 2-ethylhexyl, and the like; it can be cyclic such as cyclopentyl, cyclohexyl, cycloheptyl, and the like; it can be cycloalkyl alkyl such as cyclohexylethyl; or $R_2$ and $R_3$ can be joined to form a cycloalkyl group in which the carbon occupying position 2 in the dioxanyl ring is one of the carbons of the cycloalkyl ring.

The 5-alkylene-m-dioxanyl acrylic esters of this invention are generally relatively high boiling liquids which frequently having freezing points at about room temperature or below. The acrylates of this invention can be homopolymerized or copolymerized with another polymerizable ethylinically unsaturated compound to form interpolymers. Certain of the polymers hereby provided from the acrylic dioxanyl esters have the interesting characteristic of having a desirably high softening point, such as the polymers having groups derived from dioxanyl acrylic esters wherein both $R_2$ and $R_3$ radicals are hydrogen.

The acrylic dioxanyl esters of this invention can readily be prepared by an ester exchange reaction represented by the following equation:

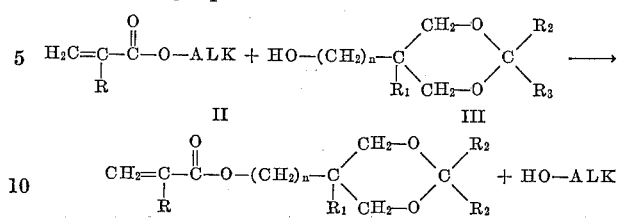

wherein ALK represents a suitable alkyl group, preferably methyl or ethyl and wherein $R_1$, $R_2$, $R_3$, and "$n$" have the definitions set forth above.

The ester exchange reactions by which the compounds of this invention are provided are conducted at an elevated temperature at which the desired 5-meta-dioxanyl acrylic ester is stable. Ordinarily it has been found useful to include in the reaction an ester exchange catalyst such as an alkyl titanate, e.g., tetrabutyl titanate, or any other useful ester exchange catalyst such as an alkali metal alkoxide, or an alkali metal oxide, hydride or hydroxide, or the like. The catalysts can be employed in general in amounts which are catalytic quantities in ester exchange reactions. For example, when tetrabutyl titanate is employed, it has been found suitable to employ about 0.01 to 0.1 mole of the catalyst per mole of the $R_1R_2R_3$-substituted dioxanyl alcohol (III) employed. It is preferable in carrying out the reaction to maintain the reaction temperature above the boiling point of the by-product alcohol (ALK-OH) but below the polymerization temperatures of the desired 5-alkylene-m-dioxanyl acrylic ester. It is desired during the preparation to remove any of the produced by-product alcohol by distillation, thereby enabling the reaction to go to a greater completion. During the reaction it is also highly desired to include in the reaction mixture a polymerization inhibitor, for example, a tertiary butylated phenol such as 2,6-ditertiarybutyl-4-methyl phenol, 2,6-ditertiarybutyl-4-methoxy phenol, or the like.

The ester exchange reaction is also preferably, whenever possible, conducted at a high concentration of reactants. Usually it can be conducted in the absence of diluents particularly when the 5-hydroxyalkyl dioxanyl intermediate employed (III) is of a low melting character. However, if desired and if their presence supplements the conversion of the desired acrylic esters, inert reaction solvents can be employed such as dioxane, toluene, xylene, and the like.

The desired acrylic dioxanyl esters are isolated from the ester exchange reaction mixture by conventional procerudes. For example, a relatively crude fraction of the desired dioxanyl esters can be obtained from the reaction mixture by fractional distillation. The crude products can be further purified as by extraction, precipitation, or distillation procedures of common knowledge to the art. In treating a reaction mixture containing certain catalysts such as tetrabutyl titanate, it is advisable to destroy residual catalyst activity prior to isolation treatment. The catalyst activity can readily be destroyed by first adding to the reaction mixture an inert water immiscible solvent in which the desired ester is soluble, for example, benzene, toluene, or the like. Then, distilled water is added thereto. The two phase liquid system is shaken whereupon the desired acrylic ester is taken up in the organic phase and removed from the mixture. The organic phase is filtered and is dried with a suitable drying agent such as anhydrous sodium sulfate, and the dried solution of the produced 5-alkylene-m-dioxanyl acrylic esters are stripped of solvents. The product residue can be further purified as by fractionally distilling through common conventional distillation procedures.

The 5-hydroxyalkylene-m-dioxanyl alcohols can be provided following conventional condensation procedures illustrated by the following reaction:

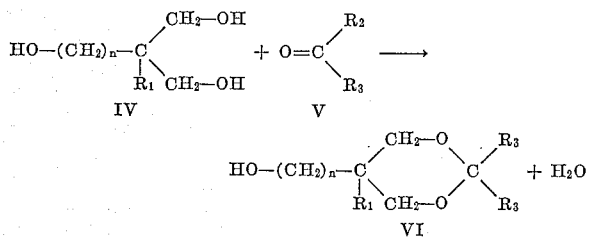

It is seen that intermediate IV is an appropriately substituted 1,3-propane diol.

Intermediate V represents either a ketone or an aldehyde with required $R_2$ and $R_3$ groups. The aldehyde in simplest form will be formaldehyde wherein $R_2$ and $R_3$ are both hydrogen substitutents. Other suitable aldehydes are the following: benzaldehyde, acetaldehyde, chloral, propionaldehyde, isobutyraldehyde, o-, m-, and p-nitrobenzaldehyde, m-chlorobenzaldehyde, anisaldehyde, furfural, and the like. Also, the reactant V can be a ketone having $R_2$ and $R_3$ groups. Suitable ketones are acetone, methyl ethyl ketone, acetophenone, cyclohexanone, cyclopentanone, methyl isobutyl ketone, benzophenone, 3-methylcyclohexanone, and the like.

In carrying on the above described condensation of intermediates IV and V, in accordance with conventional procedures, it is useful to employ an acid condensation catalyst such as p-toluene sulfonic acid. The reaction is carried out ordinarily at a suitable elevated temperature. The produced m-dioxanyl alcohol (VI) is recovered following conventional procedures, such as by distillation.

In carrying on any of the above process steps, the preparative temperatures should be maintained below a point at which neither polymerization nor pyrolysis reactions affecting the ring structure occurs. At times it will be desired to conduct the reactions at lowered pressures in order to avoid the necessity of high temperatures.

The 5-m-dioxanyl esters of this invention can be polymerized by following known methods for polymerizing acrylic type monomers. Polymerization can be conducted following bulk, solution, suspension, or emulsion polymerization techniques. Conventional catalysts can be employed, and are ordinarily advisably used. Such referred to conventional polymerization catalysts include peroxide free-radical initiators such as benzoyl peroxide, tertiary butyl hydroperoxide, tertiary butyl perbenzoate, and azotype free-radical catalyst such as alpha, alpha'-azobis-(isobutyronitrile), alpha, alpha'-azobis(ethyl isobutyrate) and 2,2-azobis(isobutyramide), and persalts such as potassium persulfate and the like.

The esters of this invention can also be copolymerized with one or more ethylenically unsaturated monomers polymerizable therewith such as the alkyl esters of acrylic or methacrylic acid such as methyl methacrylate, ethyl acrylate, octyl acrylate and benzyl acrylate; acrylamides such as methacrylamide; vinyl esters such as vinyl chloride and vinyl acetate; vinylidene chloride; acrylonitrile; allyl compounds such as diallyl adipate; vinyl aryl compounds such as styrene and divinyl benzene; and other unsaturated compounds like butadiene and maleic anhydride. It is to be understood that at times some of the above mentioned monomers will not polymerize in all concentrations or in all proportions with all of the m-dioxanyl acrylic esters provided by this invention. However, copolymers of this invention can be provided wherein a very small but effective quantity of one or more of the above m-dioxanyl acrylic esters are incorporated. For example, an effective quanity of an acrylic dioxanyl ester can be as small as about one percent by weight up to about ninety-nine percent by weight. Preferably, the acrylic dioxanyl esters of this invention are contained in the polymers of the order of at least about two or about ninety percent by weight. It is to be understood that the exact concentration will vary depending upon the particular acrylic dioxanyl ester employed as well as the other ethylenically unsaturated monomer or monomers employed.

It is to be further understood that copolymers can be made with a mixture of two or more of the novel acrylic dioxanyl esters with or without utilization of additional ethylenically unsaturated monomers.

An interesting feature of the polymers of this invention is that they can be crosslinked as by employing a peroxide free-radical catalyst such as benzoyl peroxide in the amount of one to two percent by weight based on the weight of polymer. Elevated curing temperatures are employed such as a temperature of about 120° C. or greater, preferably temperatures of about 140° C. to about 220° C. Also, acid catalysts can be employed such as p-toluene sulfonic acid. It has been found that when p-toluene sulfonic acid is employed to crosslink the polymers of this invention that a ring opening of the dioxanyl rings occurs when the acid catalyzed crosslinking is conducted in the presence of, e.g., moisture. When the acid catalyzed crosslinking is conducted in substantial absence of moisture, an altered mechanism, at times, appears to occur. When $R_2$ and $R_3$ of polymerized ester are methyl groups, acetone apparently is split out on acid curing with moisture, but not is absence of moisture.

Certain agents and certain controls can be usefully employed in the polymerizations involving the acrylic ester. For example, control of temperatures and pressures can greatly contribute to the character of the end polymer products. Certain agents acting as telogens can be employed. If emulsion polymerization is employed, emulsifying agents will be added such as fatty acid soaps, fatty acid esters of polyalkylene glycols, sulfated alcohols, or the like.

The polymers provided hereby are useful in coating various objects, as adhesives and are useful in molding and casting operations. For example, the polymer can be ordinarily dissolved in a suitable solvent and laid down as a cast film. The end polymers can be foamed or they can be crosslinked as by application of heat or by the incorporation of an acid catalyst or a peroxide catalyst into the polymer mix.

The above provided acrylic dioxanyl esters are additionally highly useful in providing a diol of the following formula wherein both of the hydroxy groups of the glycol are primary:

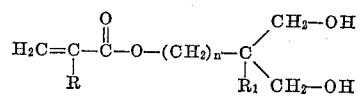

These derivable glycols are disclosed in the copending application filed simultaneously herewith by Francis R. Galiano et al., Serial Number 196,914, now Patent No. 3,210,327. The disclosed glycols can be either polymerized as polyesters such as by the reaction with dicarboxylic acid agents (such as with phthalic anhydride) or can be polymerized through the ethylenic unsaturation.

The following examples illustrate the provided invention but are not to be interpreted as being in limitation thereof except as defined by the appended claims.

Example 1

A solution of 2-hydroxymethyl-2-methyl-1, 3-propanediol (0.25 mole, 30 g.) and 37% aqueous formaldehyde (0.25 mole, 20 g.) is acidifed with p-toluene sulfonic acid hydrate and is heated with stirring for eighteen hours at 85° C. followed by stirring for four and one-half hours at room temperature. The reaction mixture is then neutralized by the addition of solid sodium acetate. The neutralized mixture is fractionally distilled in vacuo providing a main fraction containing the desired dioxane product collected at 72–74° C./0.8 mm. The infrared spectrum of the fraction of 5-hydroxymethyl-5-methyl-m-dioxane shows a strong hydroxyl band at 2.8 microns and a strong ether band at 9.1 microns in confirmation that the product is the desired 5-hydroxymethyl-5-methyl-m-dioxane.

Elemental analysis calculated for $C_6H_{12}O_3$: C, 54.52%; H, 9.15%; found: C, 53.98%; H, 8.66%.

Example 2

2-hydroxymethyl-2-methyl-1, 3-propanediol (0.5 mole, 60 g.) is mixed with excess acetone (175 ml.) in a 500-ml. flask equipped with a Dean-Stark trap and a reflux condenser. A 2:1 mixture by volume of 2,2-dimethylbutane and n-pentane (total vol. 150 ml.) is added to the acetone mixture and the mixture is acidified with 1.5 g. of p-toluene sulfonic acid hydrate. The mixture is refluxed (40° C.) for twenty-nine hours during which time 11 ml. of a water-acetone phase is removed. The solution is then neutralized by the addition of anhydrous sodium acetate and is filtered. Solvents are removed by means of a rotating evaporator and the product is fractionally distilled in vacuo. The main fraction (63 g., 79%) containing the desired dioxane product is obtained at 53–54° C./0.1 mm. The infrared spectrum of the product shows strong bands at 2.8, 9.1, and 12.0 microns which are in confirmation that the product is the desired 5-hydroxymethyl-2,2,5-trimethyl-m-dioxane.

Elemental analysis calculated for $C_8H_{16}O_3$: C, 59.97%; H, 10.07%; found: C, 59.71%; H, 10.04%.

Example 3

To a mixture of 206 g. (1.29 moles) of 5-hydroxymethyl-2,2,5-trimethyl-m-dioxane and 440 g. (4.40 moles) of methyl methacrylate are added 1.2 g. of 2,6-ditertiarybutyl-4-methyl phenol and 29 ml. of tetrabutyl titanate. The reaction flask is attached to a distillation column consisting of two insulated 12-inch Vigreux columns. Heat is applied and a methyl methacrylate-methyl alcohol azeotrope (85% methanol) boiling at 64.5–65° C. is removed continuously over a one and one-half hour period. After 67 ml. of azeotrope is removed, the temperature rises to 98–100° C. at which point 70 ml. of methyl methacrylate is distilled off. The reaction mixture is cooled and is stripped of excess methyl methacrylate. Benzene (200 ml.) is added to the reaction residue containing the desired dioxane and the mixture is shaken vigorously with 40 ml. of water, thereby destroying the catalyst activity. The benzene extract is filtered, is dried over anhydrous sodium sulfate, is stripped of solvents, and is finally fractionally distilled employing the column described hereinabove. A fraction of the desired (2,2,5-trimethyl-5-m-dioxanyl)methyl methacrylate is collected (216.5 g., 74% at 76–83° C./0.5–1.0 mm.).

Elemental analysis calculated for $C_{12}H_{20}O_4$: C, 63.16%; H, 8.77%; found: C, 63.29%; H, 9.04%.

Example 4

The procedure of Example 3 is repeated employing an equimolar quantity of 5-hydroxymethyl-5-methyl-m-dioxane as the alcohol to provide the corresponding (5-methyl-5-m-dioxanyl)methyl methacrylate having a boiling point of 72–73° C./0.5 mm.

Elemental analysis calculated for $C_{10}H_{16}O_4$: C, 60.00%; H, 8.00%; found: C, 59.76%; H, 8.11%.

Example 5

The procedure of Example 3 is repeated employing equimolar quantities of 5-hydroxymethyl-5-methyl-m-dioxane as the alcohol and methyl acrylate as the acrylic acid intermediate to provide the corresponding (5-methyl-5-m-dioxanyl)methyl acrylate having a boiling point of about 57° C./0.2 mm.

Elemental analysis calculated for $C_9H_{14}O_4$: C, 58.05%; H, 7.57%; found: C, 57.81%; H, 7.16%.

Example 6

The procedure of Example 3 is repeated employing an equimolar quantity of methyl acrylate as the acrylic acid intermediate to provide the corresponding (2,2,5-trimethyl-5-m-dioxanyl)methyl acrylate having a boiling point of about 81° C./1.0 mm.

Elemental analysis calculated for $C_{11}H_{18}O_4$: C, 61.65%; H, 8.49%; found: C, 62.14%; H, 8.95%.

Example 7

Other 5-alkylene-5-m-dioxanyl acrylic esters can be provided by following essentially the process of Example 3. The appropriate 5-hydroxyalkylene-m-dioxane having the necessary $R_1$, $R_2$ and $R_3$ substituents is employed. The required 5-hydroxyalkylene-m-dioxane can be prepared by condensing an appropriate 1,3-propane diol and a suitable substituted $R_1R_2$ aldehyde or ketone according to, in general, the procedures of condensation described in Examples 1 and 2 above. The 5-hydroxyalkylene-m-dioxane alcohol intermediate is then condensed with a methyl acrylic ester (viz., methyl acrylate, methyl methacrylate, or methyl ethacrylate) to provide the following m-dioxanyl acrylic ester compounds:

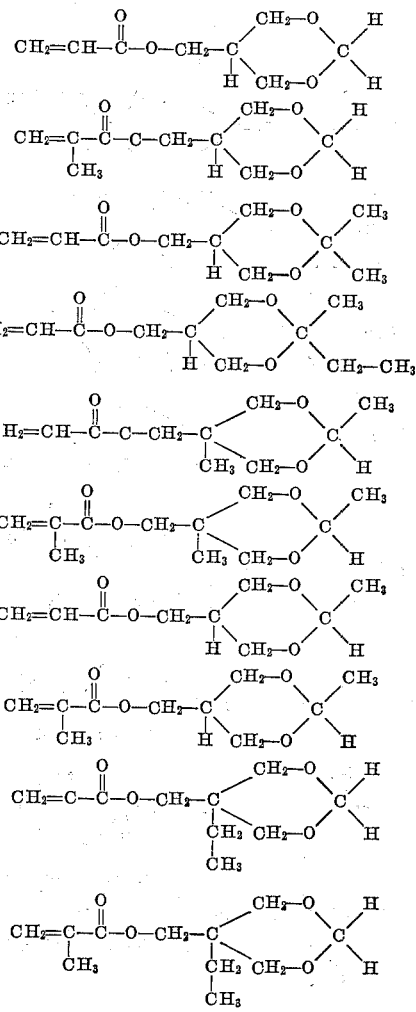

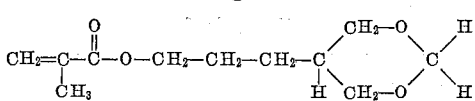

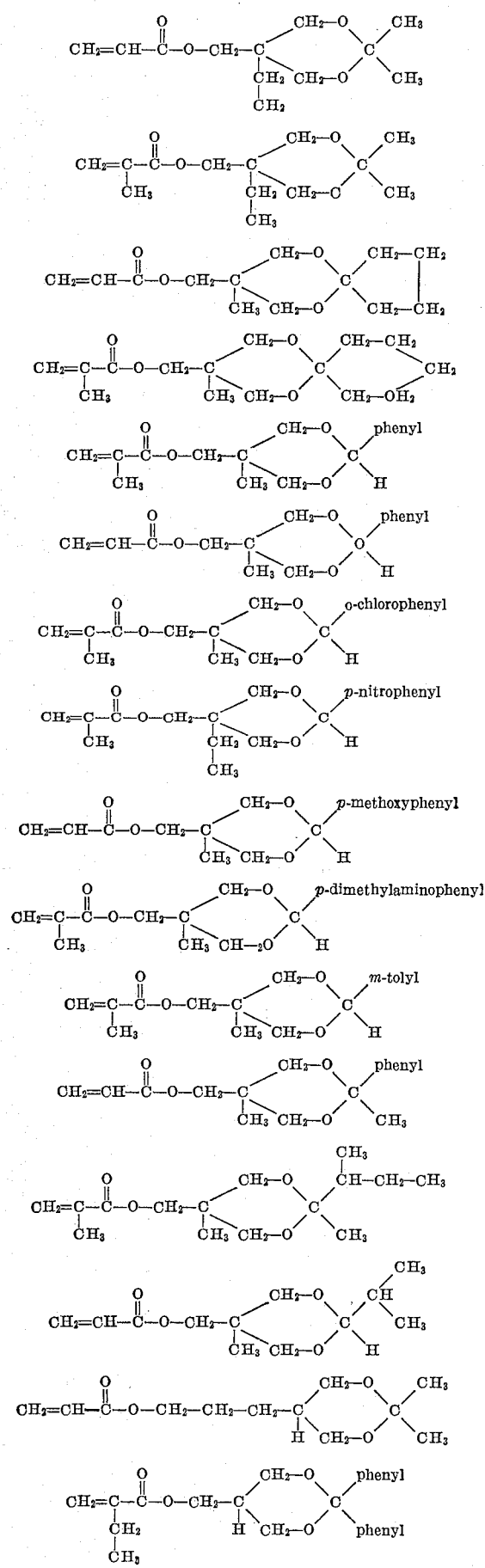

Example 8

A bulk polymerization of (2,2,5-trimethyl-5-m-dioxanyl)methyl methacrylate is carried out in glass polymerization cells prepared in the following manner. Two glass plates having the dimensions ¼" x 4" x 6" were beveled on one edge. These cells are washed, are dried, and are coated with a 1% solution of dichlorodimethylsilane in petroleum ether. Igepal CO-630 (a polyethylene oxide phenol condensation surfactant product sold by General Aniline & Film Company) is then spread on the surface, and is subsequently washed off thoroughly with distilled water. After drying, the plates are stacked on top of each other, spaced along the three non-beveled edges with moist strips of cellophane. The cell is then sealed on these three edges with a gelatin-glycerin mixture containing a small amount of water and is placed in an oven at 100° C. for several hours to harden the seal.

The polymerization is carried out as follows: (2,2,5-trimethyl-5-m-dioxanyl)methyl methacrylate (2.0 g.) is mixed with 2 mg. (0.1%) of 2,2-azoisobutyronitrile as initiator. The material is then introduced into the polymerization cell by means of a syringe. When the cell is completely filled, the top edge is sealed with the gelatin mixture and is placed in an oven at 60° C. for eighteen hours. The material then has "set" and the temperature is raised to 120° C. over a two-hour period and kept at that temperature for an additional six hours. After cooling, the polymer, consisting of homopolymerized (2,2,5-trimethyl-5-m-dioxanyl)methyl methacrylate is removed by scraping off the gelatin seal and separating the plates. The homopolymer is solvent soluble and softens at 115–125° C.

Following the above procedure (5-methyl-5-m-dioxanyl)methyl acrylate is homopolymerized to provide a solvent insoluble homopolymer.

Example 9

A solution copolymerization of (5-methyl-5-m-dioxanyl)methyl methacrylate and methyl methacrylate is carried out as follows: Benzene (12 ml.) is refluxed under argon for one-half hour in a 100-ml., three-neck, round bottom flask equipped with a gas inlet, reflux condenser, syringe cap, and a magnetic stirring bar. Argon is also bubbled through a mixture of monomers [5 g. of (5-methyl-5-m-dioxanyl)methyl methacrylate and 7.5 g. of methyl methacrylate] for one-half hour at room temperature. The catalyst, 2,2-azobisisobutyronitrile (0.020 g.), is then dissolved in the above monomer mixture. The monomer-initiator mixture is added dropwise by a syringe to the boiling benzene mixture over a period of one-half hour. After three and one-half hours at reflux, the viscosity of the reaction mixture had increased so that stirring became difficult. Additional benzene (2 ml.) is added to permit stirring. In seven hours after the last benzene addition, 2 ml. more benzene is added. The reaction mixture is then heated overnight (sixteen hours) at 50° C. After cooling, 50 ml. of benzene is then added and the reaction mixture is poured into a large amount of vigorously stirred methanol (1000 ml.). The methanol is suction filtered separating a white solid consisting of the copolymer of (5-methyl-5-m-dioxanyl)methyl methacrylate and methyl methacrylate. The solid copolymer is again stirred with 500 ml. of fresh methanol, is filtered, and is dried under vacuum. The copolymer product is solvent soluble; has the high softening point of 138–165° C., and the Barcol hardness value of 90.

Following the above procedure (5-methyl-5-m-dioxanyl)methyl methacrylate is polymerized to form a homopolymer which is soluble in benzene (i.e., solvent soluble) has an inherent viscosity of 0.99 in tetrahydrofuran at 25° C. at a concentration of 0.5 g./100 ml., softens at 160–175° C., and has a Barcol hardness value of 84.

Following the above procedure (2,2,5-trimethyl-5-m-dioxanyl)methyl methacrylate is polymerized to form a homopolymer which is solvent soluble, softens at 117–124° C., has an inherent viscosity of 0.35 in tetrahydrofuran at 25° C. at a concentration of 0.5 g./100 ml.

Following the above procedure (5-methyl-5-m-dioxanyl)methyl acrylate is polymerized to form a solvent soluble homopolymer which softens at 60–70° C., has an inherent viscosity in tetrahydrofuran as above described of 0.51, and has a Barcol hardness value of 65.

Following the above procedure (2,2,5-trimethyl-5-m-dioxanyl) methyl acrylate is polymerized to form a solvent soluble homoplymer which softens at 41–45° C., has an inherent viscosity of 0.62 determined in tetrahydrofuran as described above, and has a Barcol hardness value of 65.

Following the polymerization procedures set out in Examples 8 and 9 above, the remaining 5-alkylene-m-dioxanyl esters of Examples 1–7 can be homopolymerized and copolymerized with copolymerizable ethylenically

*Example 10*

In illustration of curing of the polymers of this invention, benzene-soluble, homopolymers of (5-methyl-5-m-dioxanyl)methyl and (2,2,5 - trimethyl - 5 - m-dioxanyl) methyl acrylates or methacrylates have been cured under the conditions and with the results as described below. The weights of curing agents are given in percentages by weight based on the weight of the polymer.

A homopolymer of (5-methyl-5-m-dioxanyl)methyl methacrylate cured with one percent by weight of dicumyl peroxide at 146° C. in a dry argon atmosphere after 30 minutes provided a mostly insoluble polymer having a pencil hardness value of 5H; at 146° C. after 60 minutes using two percent by weight of trichloroacetic acid provided a mostly insoluble polymer having a pencil hardness value of 9H; and at 146° C. after 30 minutes using two percent by weight of p-toluene sulfonic acid in a moist argon atmosphere provided a mostly insoluble cured polymer having a pencil hardness value of 7H. A homopolymer of (5-methyl-5-m-dioxanyl)methyl acrylate cured for 30 minutes at 150° C. using one percent by weight of dicumyl peroxide in the presence of air provided a cured polymer mostly insoluble having a pencil hardness value of 5H, and after 90 minutes the cured polymer is essentially completely insoluble in benzene and has a pencil hardness value of 9H; using two percent by weight of trichloroacetic acid in an air atmosphere at 150° C. provided after 30 minutes a mostly insoluble unsaturated monomers, e.g., acrylonitrile, butadiene, styrene, methyl acrylate, and the like.
polymer having a pencil hardness value of 3H, and after 90 minutes a cured polymer essentially completely insoluble is provided having a pencil hardness value of 6H. A homopolymer of (2,2,5-trimethyl-5-m-dioxanyl)methyl acrylate is cured in an air atmosphere at 150° C. with one percent by weight of dicumyl peroxide to provide a cured polymer after 30 minutes mostly insoluble and having a pencil hardness value of 4H, and after 90 minutes provided an essentially completely insoluble cured polymer having a pencil hardness value in excess of 9H; and with two percent by weight of trichloroacetic acid in an air atmosphere at 150° C. is provided after 30 minutes an essentially completely insoluble cured polymer having a pencil hardness value in excess of 9H.

What is claimed is:

1. A polymerizable 5-alkylene-m-dioxanyl acrylic ester represented by the following formula:

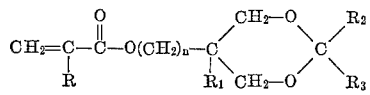

wherein N represents an integer from 1 to 4 inclusive, R is selected from the group consisting of lower alkyl and hydrogen, $R_1$ is selected from the group consisting of lower alkyl radicals having 1 to 4 carbon atoms and hydrogen, $R_2$ and $R_3$ are selected from the group consisting of hydrogen, alkyl, and phenyl and alkyl and phenyl having attached thereto substituents selected from the group consisting of lower alkoxy, lower alkyl, cycloalkyl, nitro, chloro, bromo and dialkylamino.

2. A polymerizable acrylic ester of claim 1 wherein the ester is an ester of acrylic acid.

3. A polymerizable acrylic ester of claim 1 wherein the ester is an ester of methacrylic acid.

4. A polymerizable compound of the formula:

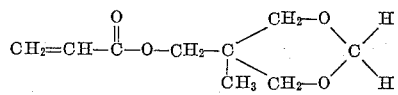

5. A polymerizable compound of the formula:

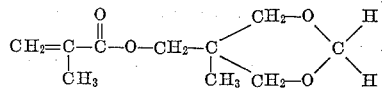

6. A polymerizable compound of the formula:

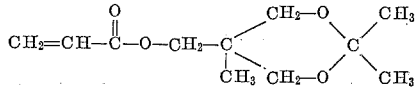

7. A polymerizable compound of the formula:

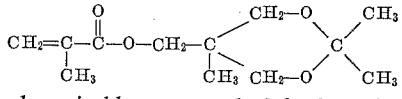

8. A polymerizable compound of the formula:

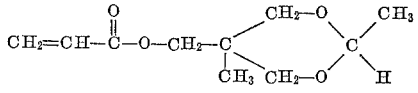

9. A polymerizable compound of the formula:

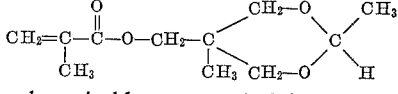

10. A polymerizable compound of the formula:

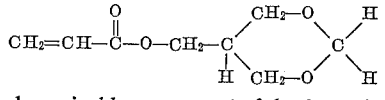

11. A polymerizable compound of the formula:

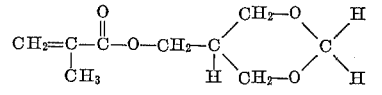

12. A polymerizable compound of the formula:

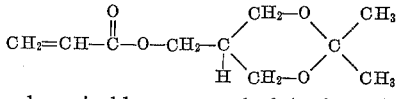

13. A polymerizable compound of the formula:

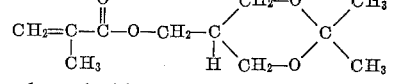

14. A polymerizable compound of the formula:

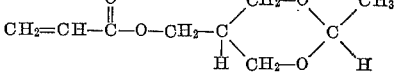

15. A polymerizable compound of the formula:

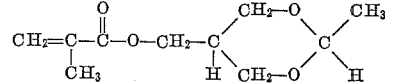

16. A homopolymer of a compound of claim 1.
17. A homopolymer of a compound of claim 2.
18. A homopolymer of a polymerizable ester of claim 3.
19. A homopolymer of the polymerizable ester of claim 4.
20. A homopolymer of the polymerizable ester of claim 5.
21. A homopolymer of the polymerizable ester of claim 6.
22. A homopolymer of the polymerizable ester of claim 7.
23. A homopolymer of the polymerizable ester of claim 8.
24. A homopolymer of the polymerizable ester of claim 9.
25. A homopolymer of the polymerizable ester of claim 10.
26. A homopolymer of the polymerizable ester of claim 11.
27. A homopolymer of the polymerizable ester of claim 12.
28. A homopolymer of the polymerizable ester of claim 13.
29. A homopolymer of the polymerizable ester of claim 14.
30. A homopolymer of the polymerizable ester of claim 15.
31. A copolymer of a compound of claim 1 and another polymerizable ethylenically unsaturated monomer of the general formula $H_2C\!=\!C\!<$.
32. A copolymer of a compound of claim 2 and another polymerizable ethylenically unsaturated monomer of the general formula $H_2C\!=\!C\!<$.
33. A copolymer of a compound of claim 3 and another polymerizable ethylenically unsaturated monomer of the general formula $H_2C\!=\!C\!<$.
34. A copolymer of the compound of claim 5 and methyl methacrylate.
35. A process of providing a crosslinked polymer which comprises heating a polymer having groups corresponding to a 5-alkylene-m-dioxanyl acrylic ester of claim 1 with an initiating amount of a peroxide free-radical initiator at an elevated curing temperature.
36. A process of providing a crosslinked polymer which comprises heating a polymer having groups corresponding to a 5-alkylene-m-dioxanyl ester of claim 1 with an initiating amount of an acid catalyst at an elevated curing temperature.
37. A process of claim 36 wherein the crosslinking is conducted in the presence of moisture.
38. A process of claim 36 wherein the crosslinking is conducted under substantially anhydrous conditions.

References Cited by the Examiner

UNITED STATES PATENTS

| | | | |
|---|---|---|---|
| 2,680,735 | 6/1954 | Fegley et al. | 260—86.1 |
| 2,924,607 | 2/1960 | Pattison | 260—88.3 |

JOSEPH L. SCHOFER, *Primary Examiner.*

JOSEPH R. LIBERMAN, *Examiner.*

H. WONG, *Assistant Examiner.*

UNITED STATES PATENT OFFICE
CERTIFICATE OF CORRECTION

Patent No. 3,267,084                      August 16, 1966

David Rankin et al.

It is hereby certified that error appears in the above numbered patent requiring correction and that the said Letters Patent should read as corrected below.

Column 2, lines 52 and 53, for "procerudes" read -- procedures --; column 4, line 10, for "or" read -- to --; column 6, lines 38 to 41, the left-hand protion of the formula should appear as shown below instead of as in the patent:

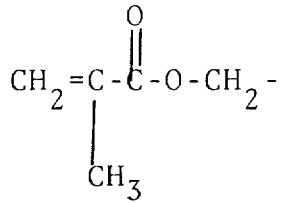

lines 50 to 54, the left-hand portion of the formula should appear as shown below instead of as in the patent:

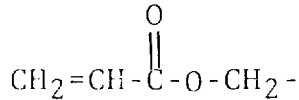

column 6, lines 65 to 69, the left-hand portion of the formula should appear as shown below instead of as in the patent:

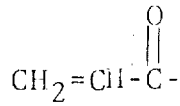

3,267,084
column 7, lines 1 to 5, for that portion of the formula reading
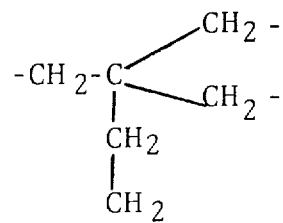     read     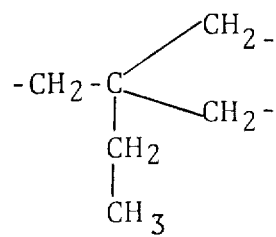
lines 6 to 10, for that portion of the formula reading
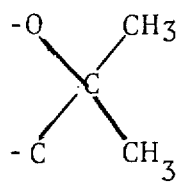     read     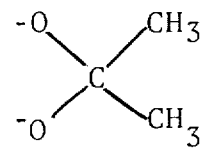
lines 16 to 19, for that portion of the formula reading
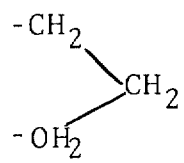     read     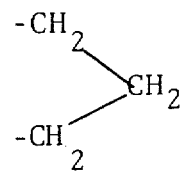
lines 42 and 46, for that portion of the formula reading
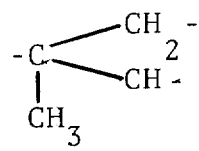     read     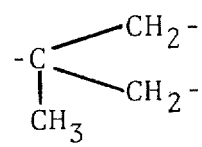

3,267,084 column 8, line 13, for "ether," read -- ether. --; same column 8, lines 38 and 72, and column 9, lines 3, 8, and 13, after "procedure", each occurrence, insert a comma; column 9, line 15, for "homoploymer" read -- homopolymer --; same column 9, lines 52 and 53, strike out "unsaturated monomers, e.g., acrylonitrile, butadiene, styrene, methyl acrylate, and the like." and insert the same after "ethylenically" in line 22, same column 9.

Signed and sealed this 5th day of September 1967.

(SEAL)
Attest:

ERNEST W. SWIDER
Attesting Officer

EDWARD J. BRENNER
Commissioner of Patents